US012395570B2

(12) United States Patent
Parker

(10) Patent No.: US 12,395,570 B2
(45) Date of Patent: Aug. 19, 2025

(54) METHODS, SYSTEMS, AND APPARATUS FOR PRESENTING PARTICIPANT INFORMATION ASSOCIATED WITH A MEDIA STREAM

(71) Applicant: DISH Technologies L.L.C., Englewood, CO (US)

(72) Inventor: Scott Michael Parker, Aurora, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 17/577,548

(22) Filed: Jan. 18, 2022

(65) Prior Publication Data

US 2022/0141314 A1 May 5, 2022

Related U.S. Application Data

(63) Continuation of application No. 16/811,720, filed on Mar. 6, 2020, now Pat. No. 11,228,662, which is a continuation of application No. 15/190,885, filed on Jun. 23, 2016, now Pat. No. 10,623,525.

(51) Int. Cl.
*H04L 67/63* (2022.01)
*H04L 65/611* (2022.01)
*H04L 67/02* (2022.01)
*H04L 67/306* (2022.01)
*H04L 67/52* (2022.01)

(52) U.S. Cl.
CPC ............ *H04L 67/63* (2022.05); *H04L 65/611* (2022.05); *H04L 67/02* (2013.01); *H04L 67/306* (2013.01); *H04L 67/52* (2022.05)

(58) Field of Classification Search
CPC . H04L 67/327; H04L 67/306; H04L 65/4076; H04L 67/18; H04L 67/02; H04L 67/63; H04L 65/611; H04L 67/52
See application file for complete search history.

(56) References Cited

U.S. PATENT DOCUMENTS

| 5,860,862 | A | 1/1999 | Junkin | |
|---|---|---|---|---|
| 7,577,973 | B1 * | 8/2009 | Kapner, III | ............ H04N 21/84 725/39 |
| 8,056,099 | B2 | 11/2011 | Shanks et al. | |

(Continued)

OTHER PUBLICATIONS

"The Xbox One's new NFL app is a superfan's dream", Dan Seifert, The Verge, Aug. 7, 2015. https://www.theverge.com/2015/8/7/9114381/xbox-one-nfl-app-surface-sidelines.

(Continued)

*Primary Examiner* — Oanh Duong
(74) *Attorney, Agent, or Firm* — Perkins Coie LLP

(57) ABSTRACT

Various embodiments of systems, apparatus, and/or methods are described for selectively obscuring a rendering of a media stream. In one implementation, the method includes receiving a media stream with a receiving device, receiving event data associated with the media stream, generating identification data based at least in part on the event data, presenting the media stream and identification data on a presentation device, receiving at least one participant selection from a user interface device, retrieving participant information based on the at least one participant selection, and presenting the participant information on the presentation device.

20 Claims, 8 Drawing Sheets

(56) References Cited

U.S. PATENT DOCUMENTS

| | | | |
|---|---|---|---|
| 8,161,081 B2 | 4/2012 | Kaufman et al. | |
| 8,485,877 B2 | 7/2013 | Saks et al. | |
| 8,566,413 B2* | 10/2013 | Horvitz | H04L 67/75 709/224 |
| 8,904,430 B2 | 12/2014 | Zalewski | |
| 9,031,382 B1 | 5/2015 | Kaiser et al. | |
| 9,113,214 B2 | 8/2015 | Andrews, II et al. | |
| 9,697,504 B2 | 7/2017 | Spitz et al. | |
| 11,228,662 B2* | 1/2022 | Parker | H04L 67/02 |
| 2002/0108125 A1 | 8/2002 | Joao | |
| 2003/0115602 A1 | 6/2003 | Knee et al. | |
| 2004/0193723 A1* | 9/2004 | Kabatani | H04N 21/4788 375/E7.006 |
| 2006/0183547 A1 | 8/2006 | McMonigle | |
| 2007/0234213 A1 | 10/2007 | Krikorian et al. | |
| 2007/0240232 A1 | 10/2007 | Pino et al. | |
| 2007/0271589 A1 | 11/2007 | Yogaratnam et al. | |
| 2008/0226253 A1 | 9/2008 | Steinberg et al. | |
| 2009/0186700 A1 | 7/2009 | Konkle | |
| 2009/0295715 A1* | 12/2009 | Seo | G06F 3/04886 345/156 |
| 2009/0300520 A1 | 12/2009 | Ashutosh et al. | |
| 2010/0092155 A1 | 4/2010 | Inagaki et al. | |
| 2010/0153831 A1 | 6/2010 | Beaton | |
| 2010/0265125 A1 | 10/2010 | Kelly et al. | |
| 2011/0066743 A1 | 3/2011 | Hurley et al. | |
| 2011/0072067 A1 | 3/2011 | Gartner et al. | |
| 2011/0107215 A1 | 5/2011 | Klappert | |
| 2011/0167078 A1 | 7/2011 | Benjamin et al. | |
| 2011/0221745 A1 | 9/2011 | Goldman et al. | |
| 2012/0011544 A1 | 1/2012 | Vaysman et al. | |
| 2013/0198629 A1 | 8/2013 | Tandon et al. | |
| 2013/0296046 A1 | 11/2013 | Mianji | |
| 2013/0338803 A1 | 12/2013 | Maoz et al. | |
| 2014/0047356 A1 | 2/2014 | Ameller-Van-Baumberghen et al. | |
| 2015/0074711 A1 | 3/2015 | Spitz et al. | |
| 2015/0248918 A1 | 9/2015 | Tang | |
| 2015/0296346 A1* | 10/2015 | Roman | H04L 67/535 455/456.1 |
| 2015/0352450 A1 | 12/2015 | Burrows et al. | |
| 2016/0106346 A1* | 4/2016 | Benzel | A61B 5/1122 600/595 |
| 2016/0154824 A1 | 6/2016 | Song et al. | |
| 2016/0294894 A1 | 10/2016 | Miller | |
| 2017/0104957 A1* | 4/2017 | Farrell | G06F 3/04842 |
| 2017/0282075 A1 | 10/2017 | Michot et al. | |
| 2017/0374124 A1 | 12/2017 | Parker | |
| 2019/0034545 A1* | 1/2019 | Sa | G06F 16/3346 |
| 2020/0213418 A1 | 7/2020 | Parker | |

OTHER PUBLICATIONS

"Time to Get More Stats Into Local Sports Broadcasts", Pittsburgh Post-Gazette, Apr. 30, 2015.

Comcast Upgrades On-Screen Program Guide, PR Newswire, Sep. 7, 2010.

* cited by examiner

METHODS, SYSTEMS, AND APPARATUS FOR PRESENTING PARTICIPANT INFORMATION ASSOCIATED WITH A MEDIA STREAM

CROSS-REFERENCE TO RELATED PATENT APPLICATIONS

This application is a continuation of U.S. patent application Ser. No. 16/811,720 filed Mar. 6, 2020, entitled "METHODS, SYSTEMS, AND APPARATUS FOR PRESENTING PARTICIPANT INFORMATION ASSOCIATED WITH A MEDIA STREAM," which is a continuation of U.S. patent application Ser. No. 15/190,885 filed Jun. 23, 2016, entitled "METHODS, SYSTEMS, AND APPARATUS FOR PRESENTING PARTICIPANT INFORMATION ASSOCIATED WITH A MEDIA STREAM," the contents of which are herein incorporated by reference in their entirety.

BACKGROUND

Receiving devices, such as set-top boxes for satellite and cable television services, allow a user to view media streams from a variety of media sources. The receiving device renders a media stream after receiving a request from the user to view the media stream. For example, the user may send a request to the receiving device to change to a different television channel, then the receiving device tunes to the new television channel and renders the media stream from the new television channel. Each media stream that is rendered may involve different participants. The participants may be actors, writers, directors, sports players, coaches, referees, or other people involved in the media stream. Often, the identities and information about the participants are not known to the viewer, and may not be immediately available to the viewer.

SUMMARY

The present disclosure relates to systems, methods, and apparatus for presenting participant information associated with a media stream. In one implementation, the method includes receiving a media stream with a receiving device; receiving event data associated with the media stream; generating, by the receiving device, identification data based at least in part on the event data; providing the media stream and the identification data to a presentation device; receiving at least one participant selection from a user interface device based on the provided identification data; retrieving participant information based on the at least one participant selection; and providing the participant information to the presentation device.

In one implementation, a receiving device includes a communication module configured to receive a media stream and event data associated with the media stream; a control logic configured to generate identification data based at least in part on the event data; a rendering module configured to provide the media stream and the identification data to a presentation device; and a user communication module configured to receive at least one participant selection from a user interface device based on the identification data provided to the presentation device. The control logic then retrieves participant information based on the at least one participant selection, and the rendering module then provides the participant information to the presentation device.

In some examples, the event data identifies one or more participants currently participating in the media stream. In some examples, the identification data includes a list of participants currently being presented in the media stream. In some examples, the identification data comprises an identifier of at least one participant currently being presented in the media stream. In some examples, the identifier includes a pop-up window linked to the at least one participant. In some examples, the identifier includes a highlighted outline linked to the at least one participant. In some examples, the event data is embedded in the media stream. In some examples, the participant information is embedded in the media stream. In some examples, the participant information includes statistics associated with the at least one selected participant. In some examples, the media stream includes one or more of a sporting event media stream, a movie media stream, television show media stream, musical event media stream, and an internet video media stream.

It is to be understood that both the foregoing summary and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The same number represents the same element or same type of element in all drawings.

DETAILED DESCRIPTION OF THE DRAWINGS

The various embodiments described herein generally provide apparatus, systems and methods which facilitate the reception, processing, rendering, and outputting of a media stream. More particularly, the various embodiments described herein provide for the selection and identification of one or more participants in the media stream by a user viewing the media stream. The various embodiments further provide for the presentation of information about the selected participant.

In at least one embodiment, the media stream to be received, processed, rendered, and displayed may come in any form of media stream. Exemplary media stream formats include Motion Picture Experts Group (MPEG) standards, Flash, Windows Media and the like. It is to be appreciated that the media stream may be supplied by any source, such as an over-the-air broadcast, a satellite, or cable television distribution system, a digital video disk (DVD) or other optical disk, the Internet or other communication networks, and the like. In at least one embodiment, the media stream may be associated with supplemental data that includes text data, such as closed captioning data or subtitles. Particular portions of the closed captioning data may be associated with specified portions of the media stream.

Generally, a media stream is a contiguous block of associated audio and video data that may be transmitted to, and received by, an electronic receiving device, such as a terrestrial ("over-the-air") television receiver, a cable television receiver, a satellite television receiver, an Internet connected television or television receiver, a computer, a portable electronic device, or the like. In at least one embodiment, a media stream includes an event. The event may be a contiguous block of programming from a television channel (e.g., an episode of a television show or a football game) or other identifiable media content.

Further, a media stream may be delivered by any transmission method, such as broadcast, multicast, simulcast, closed circuit, pay-per-view, on-demand, over-the-top (by "streaming," file transfer, or other means), or other methods. Additionally, the media stream may be transmitted by way of any communication technology, such as by satellite, wire or optical cable, wireless, or other means. The media stream may also be transferred over any type of communication network, such as the Internet or other wide area network, a local area network, a private network, a mobile communication system, a terrestrial television network, a cable television network, and a satellite television network.

Figure 1:
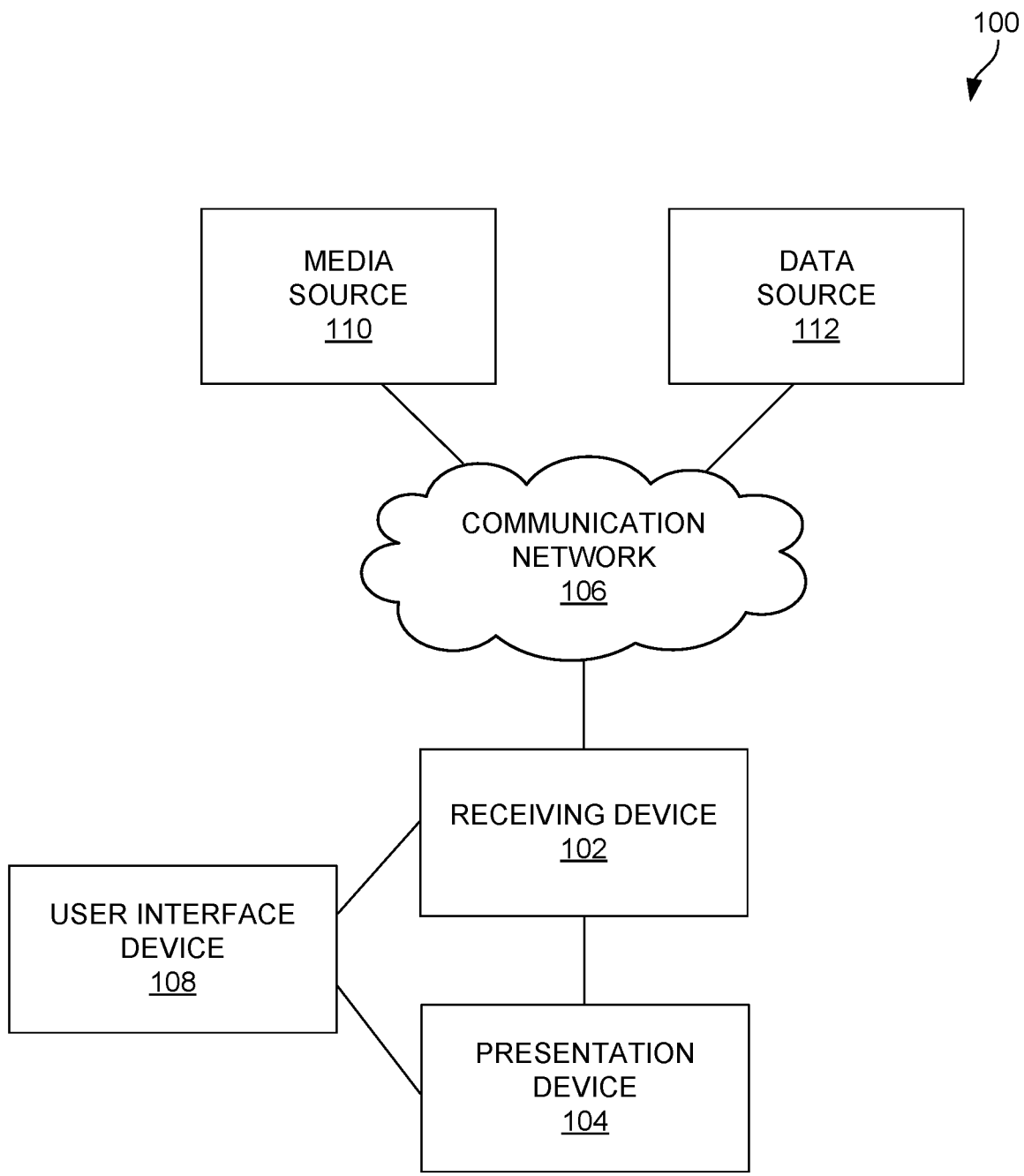
FIG. 1 illustrates an embodiment of a system for presenting a media stream and participant information to a user.

FIG. 1 illustrates an embodiment of a system 100 for presenting a media stream and participant information to a user. The system 100 includes a receiving device 102, a presentation device 104 (e.g., a display and speakers), and a user interface device 108. The receiving device 102 is operable to receive media streams from a media source 110 and event data from a data source 112 through one or more communication networks 106. The event data from the data source 112 includes information about the media streams being provided by the media source 110, as further described herein. In some embodiments, the media source 110 and data source 112 may be the same entity. In addition, in some embodiments, the event data may be embedded in the media stream from the media source 110.

The media source 110 provides media streams to the communication network 106, which allows the receiving device 102 to access the media streams. Alternatively, in some embodiments, the media source 110 provides a media stream directly to the receiving device 102 (either internally or externally of the receiving device 102). Examples of media sources 110 may include an over-the-air broadcast station, a cable television provider, a satellite television provider, a storage medium containing content, an on-demand media streaming service, a pay-per-view media streaming service, and/or an over-the-top media streaming service (e.g., internet video streaming).

The data source 112 provides event data to the communications network 106, which allows the receiving device to access the event data. Alternatively, in some embodiments, the data source 112 provides event data directly to the receiving device 102 (either internally or externally of the receiving device 102). Examples of data sources 112 may include a television network, a sports league, a sports team, a movie/television studio, a third-party data compiler, an over-the-air broadcast station, a cable television provider, a satellite television provider, a storage medium containing event data, an on-demand media streaming service, a pay-per-view media streaming service, and/or an over-the-top media streaming service (e.g., internet video streaming).

The receiving device 102 may access the media source 110 in various ways. For example, the receiving device 102 may access a media stream from a satellite provider by demodulating and decrypting the media stream provided to the communication network 106. The receiving device 102 may access an over-the-top media streaming service by logging into a remote server and downloading the media stream over the communication network 106. The receiving device 102 may access a storage medium connected to the receiving device 102 using a local communication bus, such as parallel ATA (PATA, also called IDE or EIDE), Serial ATA (SATA), SCSI, Serial Attached SCSI (SAS), Fibre Channel, IEEE 1394 (also called FireWire), USB, SCSI, or Thunderbolt.

The receiving device 102 may access the data source 112 in similar ways. For example, the event data from the data source 112 may be included in a media stream. The receiving device 102 may then access the event data by demodulating and decrypting the media stream provided to the communication network 106. The receiving device 102 may also access the data source 112 by logging into a remote server and downloading the event data over the communication network 106. The receiving device 102 may also access event data stored in a data source 112 connected to the receiving device 102 using a local communication bus, as described above.

The communication network 106 may be any network capable of distributing a media stream and/or data. Exemplary communication networks include over-the-air broadcast networks, satellite television networks, cable television networks, the Internet, cellular networks, WiFi networks, local area networks (LAN), and the like. The communication network 106 may utilize any desired combination of wired (e.g., cable and fiber) and/or wireless (e.g., cellular, satellite, microwave, and radio frequency) communication mediums and any desired network topology (or topologies when multiple mediums are utilized).

The receiving device 102 of FIG. 1 may be any device capable of receiving a media stream and event data. For example, in the case of the communication network 106 being a satellite television network, the receiving device 102 may be a set-top box (STB) configured to communicate with the satellite television network. In another example, the receiving device 102 may be computer, a personal digital assistant (PDA), or similar device configured to communicate with the Internet or comparable data communication network 106.

The receiving device 102 utilizes the received media stream and event data to generate identification data corresponding to the media stream currently being rendered. The identification data identifies one or more participants of a media stream currently being rendered by the receiving device 102. The participants may include actors, directors, writers, producers, musicians, sport players, coaches, referees, or other people involved in the current media stream. The receiving device 102 may combine the identification data with the rendering of the media stream and provide the combined audio/video rendering to the presentation device 104 for display to a user.

The presentation device 104 may be any device configured to receive an audio/video rendering from the receiving device 102 and present the audio/video rendering to a user.

Examples of the presentation device 104 include a television, a video monitor, or similar device capable of presenting audio and video information to a user. The receiving device 102 may be communicatively coupled to the presentation device 104 through any type of wired or wireless connection. Exemplary wired connections include coax, fiber, composite video and high-definition multimedia interface (HDMI). Exemplary wireless connections include WiFi, ultra-wide band (UWB) and Bluetooth. In some implementations, the presentation device 104 may be integrated with the receiving device 102. For example, each of a computer, a PDA, and a mobile communication device may serve as both the receiving device 102 and the presentation device 104 by providing the capability of receiving media streams and event data from the communication network 106, and presenting the received media streams and identification data to a user. In another implementation, a cable-ready television may include a converter device for receiving media streams and event data from the communication network 106, and displaying the media streams and identification data to a user.

In the system 100, a user requests the receiving device 102 to render a media stream provided by the media source 110 with a user interface device 108. The user interface device 108 may be a remote control, a touch screen, a mouse, a keyboard, a motion input device, a pointer, or other device capable of providing commands to the receiving device 102. Alternatively or in addition, the user interface device 108 may provide commands to the presentation device 104, which then relays the commands to the receiving device 102.

The media stream includes audio data and video data. In one embodiment, the video data includes a series of digital frames, or single images to be presented in a serial fashion to a user. Similarly, the audio data may be composed of a series of audio samples to be presented simultaneously with the video data to the user. In one example, the audio data and the video data may be formatted according to one of the MPEG encoding standards, such as MPEG-2 or MPEG-4, as may be used in DBS systems, terrestrial Advanced Television Systems Committee (ATSC) systems or cable systems. However, different audio and video data formats may be utilized in other implementations.

In addition to rendering a requested media stream, the receiving device renders identification data associated with the media stream and combines the rendered identification data with the rendered media stream. The identification data may be rendered as a window or outline overlaying the rendering of the media stream. Alternatively, the identification data may be rendered instead of rendering the media stream. The rendered identification data may include a list of the participants involved in the requested media stream. In some embodiments, the list of participants may include only those participants currently visible in the rendered media stream. Alternatively, instead of a list, the rendered identification data may be an outline or other highlighting of the one or more participants currently visible in the rendered media stream. For example, if the media stream is a football game, one or more of the players currently on the field may be highlighted with their identification data.

After the identification data is rendered and displayed on the presentation device 104, the user may select a specific participant from the rendered identification data. The user may select the participant with the user interface device 108. For example, if the identification data is rendered as a list of participants, the user may highlight a name on the list of the participants with the user interface device 108, and then select the highlighted name. Alternatively, if the identification data is rendered as an outline around the currently visible participants, the user may highlight the participant themselves with the user interface device 108, and then select the highlighted participant.

After a participant is selected, the receiving device 102 retrieves participant information associated with the selected participant. The participant information may be included in the event data received from the data source 112. In some embodiments, the participant information may be embedded in the media stream. Alternatively, in other embodiments, the participant information may be retrieved from other, third-party data sources, such as the Internet. The receiving device 102 transmits a rendering of the participant information to the presentation device 104, where it may be viewed by the user. The participant information may include statistics, facts, or other information about the selected participant. For example, if the participant is a quarterback on a football team, the participant information may include yards thrown, yards run, number of sacks, former teams, college attended, age, etc.

The participant information may be rendered as a pop-up window linked to the selected participant in the rendered media stream. Alternatively, the participant information may be rendering as a window along the side of the rendered media stream.

Figure 2:
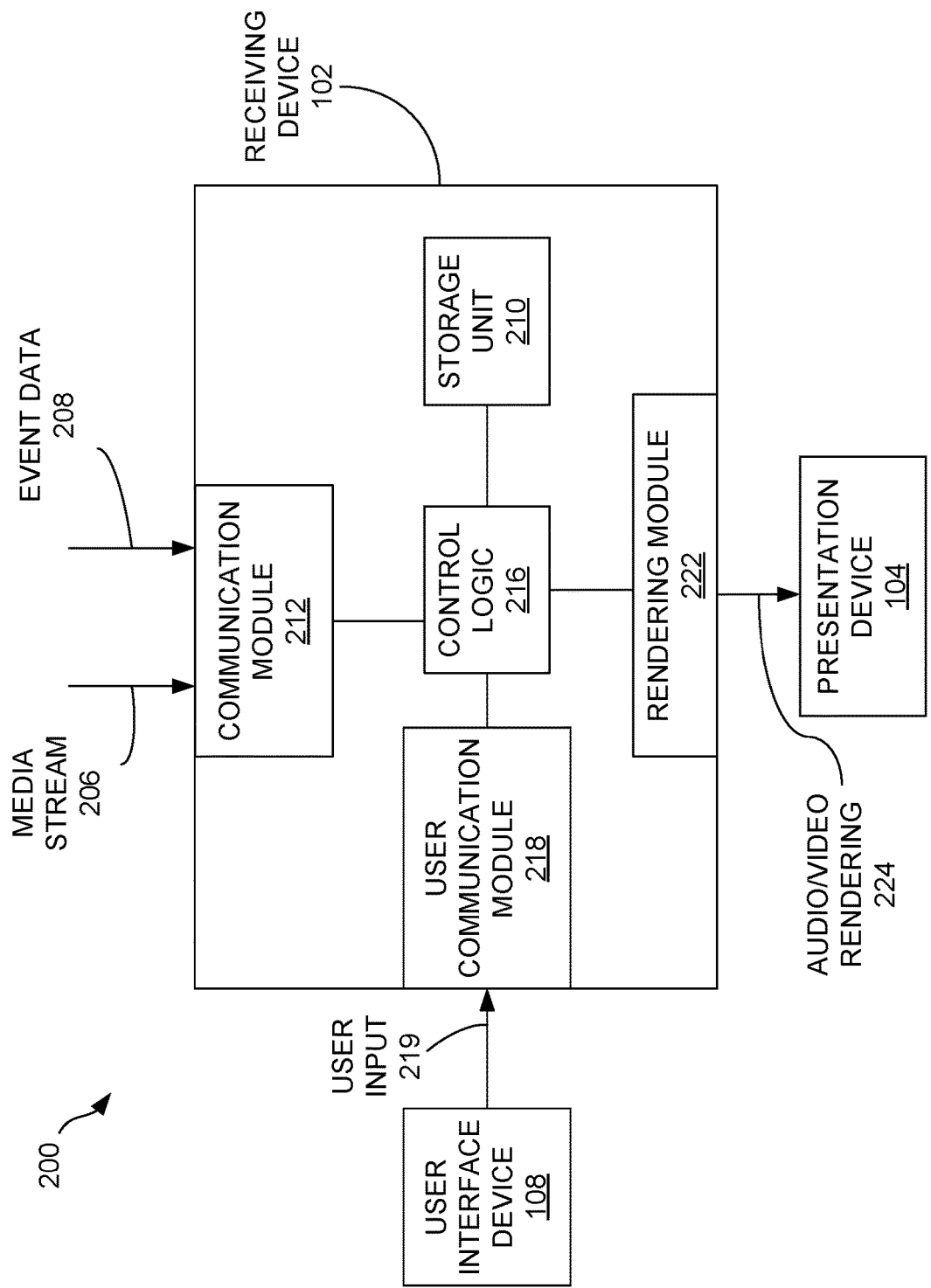
FIG. 2 illustrates an embodiment of a receiving device in a system for presenting a media stream and participant information to a user.

FIG. 2 illustrates an embodiment of a receiving device 102 in a system 200 for presenting a media stream and participant information to a user. The receiving device 102 may be an example of the receiving device described in reference to FIG. 1. The receiving device 102 will be described with reference to the communication network 106, media source 110, and data source 112 described in the system 100 of FIG. 1. The receiving device 102 includes a communication module 212 for receiving a media stream 206 and event data 208. In some embodiments, the event data 208 may be embedded in the media stream 206. One or more storage units 210 may be included internal and/or external to the receiving device 210. The storage unit 210 may store media streams, event data, instructions, or other information for the receiving device 102.

The receiving device 102 may also include user communication module 218, control logic 216, and a rendering module 222. The user communication module 218 receives user input 219 from a user interface device 108. The user communication module 218 may also transmit signals to the user interface device 108. The control logic 216 is operable to control the reception of media streams 206 and event data 208 by the communication module 212. The control logic 216 may also coordinate the storage of a media stream 206 and/or event data 208 to the storage unit 210. The control logic 216 also coordinates the output of a media stream 206 to the rendering module 222. The rendering module 222 renders the media stream 206 and outputs an audio/video rendering 224 to the presentation device 104. Furthermore, the receiving device 102 and system 200 may include other components, modules, elements, or devices not illustrated for the sake of brevity.

The communication module 212 may receive a media stream 206 from any type of communication network 106. For example, the communication module 212 may be capable of receiving a high definition media stream, a standard definition media stream, a 3-D media stream, an internet video stream, or other types of media streams.

In at least one embodiment, the control logic 216 may instruct the communication module 212 to tune to the particular broadcast channel carrying the media stream 206.

The communication module 212 may also be instructed to receive event data 208 corresponding the media stream 206. The event data 208 may be included in the media stream 206 or may be retrieved from another data source 112.

The control logic 216 then generates identification data from the event data 208, and provides the identification data to the rendering module 222. The identification data may include identifications of one or more participants of the media stream 206. The rendering module 222 may then include the identification data as part of the audio/video rendering 224 provided to the presentation device 104.

After the identification data is displayed on the presentation device 104, the user communication module 218 may receive a user input 219 selecting a particular participant included in the displayed identification data. The control logic 216 then retrieves participant information corresponding to the selected participant from the received event data 208. Alternatively, the control logic 216 may retrieve the participant information from other sources, such as the Internet, the storage unit 210, or other data sources. The control logic 216 provides the participant information to the rendering module 222, and the rendering module 222 may then include the selected participant information as part of the audio/video rendering 224.

Figure 3:
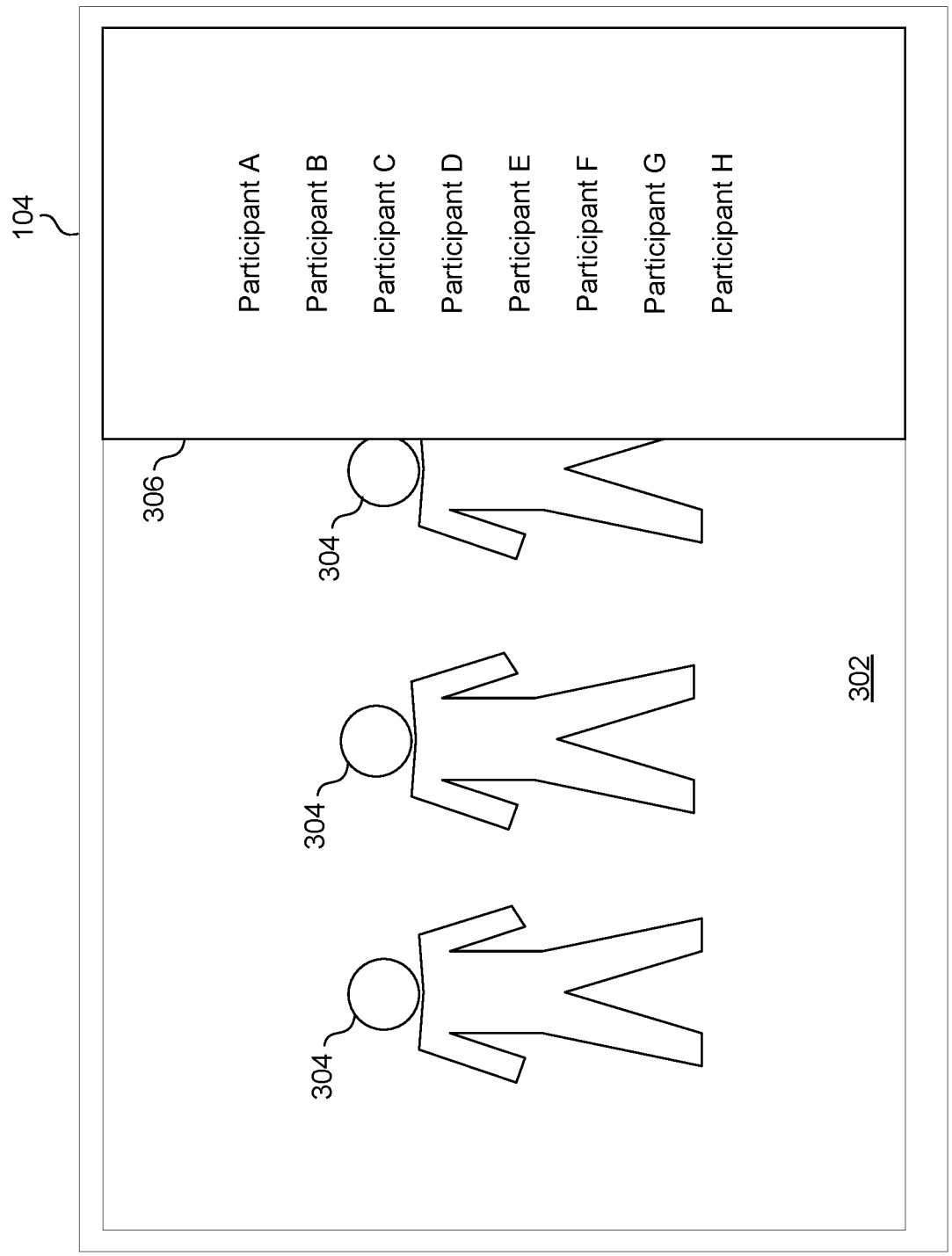
FIG. 3 illustrates an example of a presentation device displaying an audio/video rendering of a media stream.

FIG. 3 illustrates an example of a presentation device 104 displaying an audio/video rendering 302 of a media stream. The audio/video rendering 302 includes one or more participants 304 and identification data 306 identifying at least some of the participants involved in the media stream. In some embodiments, the identification data 306 may identify all participants involved in the media stream, or just those participants currently being displayed as part of the rendered media stream. As shown in FIG. 3, the identification data 306 may be rendered as a window overlaying the rendered media stream. The identification data 306 includes a list of participants. The list of participants may include all participants involved in the media stream, or may include a subset of the participants. For example, the list of participants may only include those participants 304 currently being displayed on the presentation device 104.

A user may then select a particular participant from the participants listed in the identification data 306. The user may select the particular participant by highlighting and selecting a name in the identification data 306 (e.g., "Participant A"). The particular participant may be highlighted and selected using a user interface device, such as a remote control or touch screen.

Figure 4:
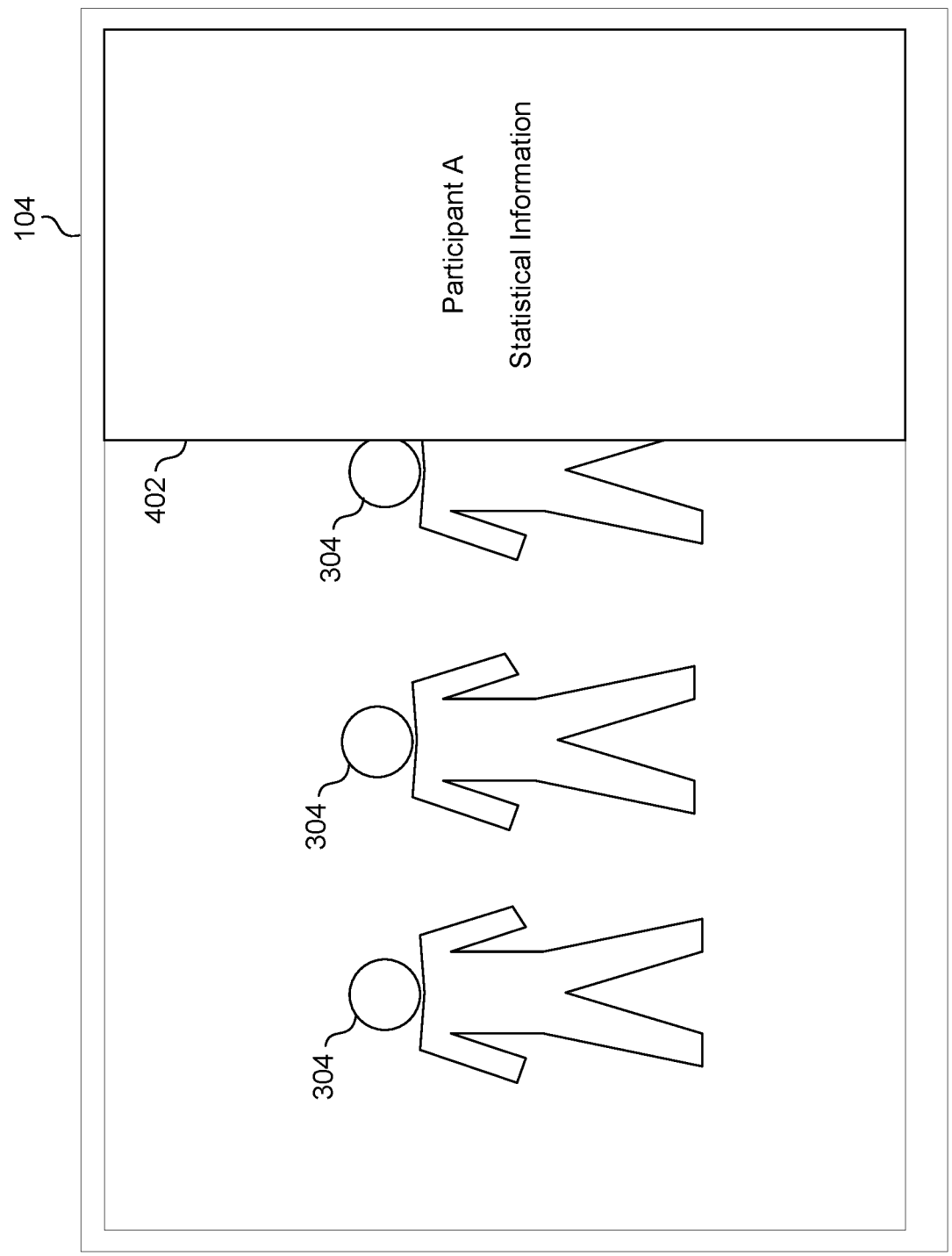
FIG. 4 illustrates an example of a presentation device displaying participant information.

FIG. 4 illustrates an example of a presentation device 104 displaying participant information 402. As shown in FIG. 4, the participant information 402 may be rendered as a window overlaying the rendered media stream. The participant information 402 being displayed corresponds to the particular participant selected by the user from the identification data 306 shown in FIG. 3. The participant information 402 may include the name of the participant, and statistics, facts, or other information related to the selected participant.

Figure 5:
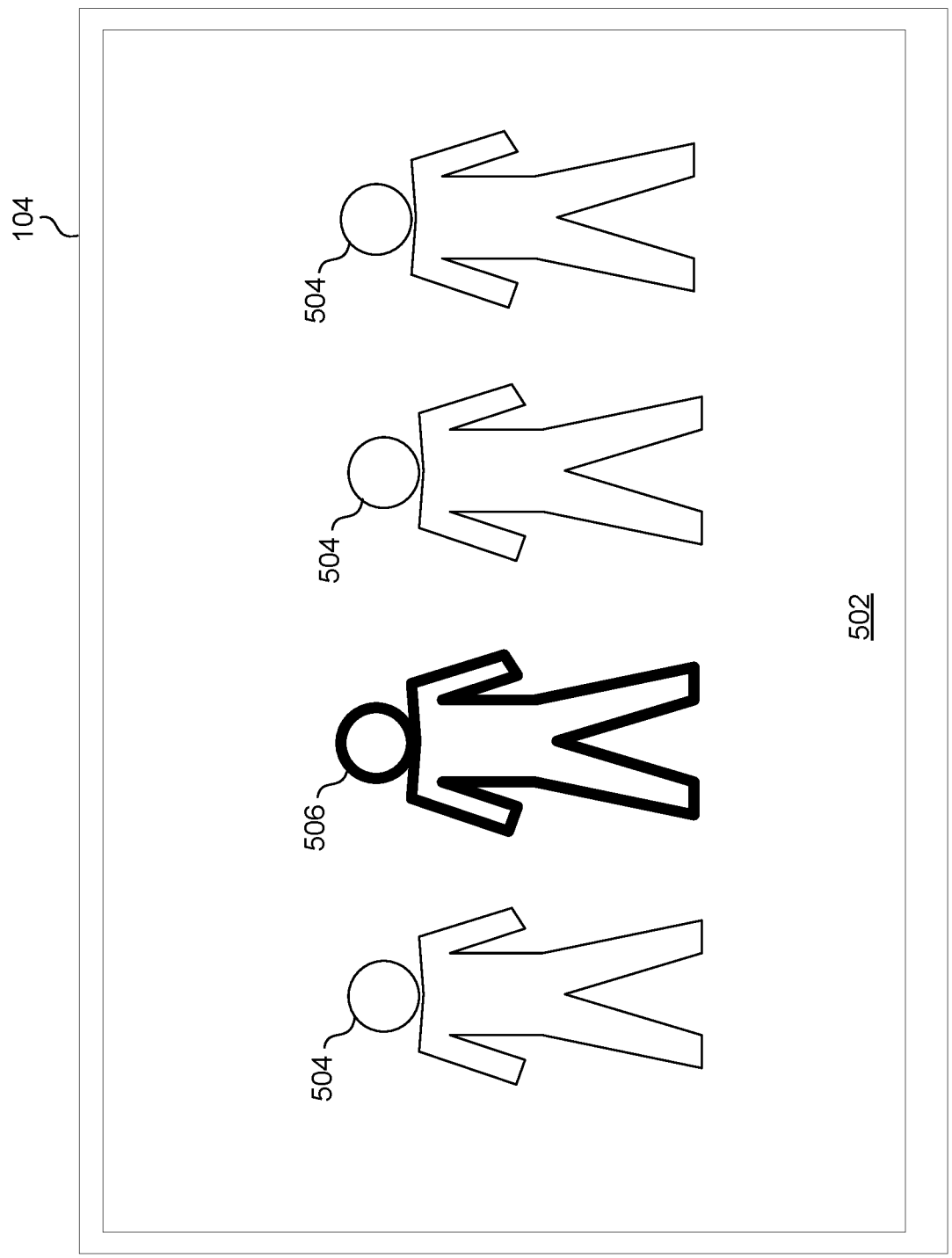
FIG. 5 illustrates an example of a presentation device displaying an audio/video rendering of a media stream.

FIG. 5 illustrates an example of a presentation device 104 displaying an audio/video rendering 502 of a media stream. As shown in FIG. 5, the audio/video rendering 502 includes one or more participants 504 and at least one highlighted participant 506. A user may select which participant 504 is the highlighted participant 506 by inputting a selection with a user interface device 108, as described in reference to FIGS. 1 and 2. In some embodiments, the identification data may include the position of the different participants 504 as they are displayed on the presentation device 104. For example, when the media stream is being recorded, the participants may carry positional sensors (e.g., radio frequency identification sensors) which track their location. These locations may then be translated into the positions where the participants 504 are displayed on the presentation device 104, and included in the event data. A receiving device 102 may then use the positions in the event data to generate the highlight around the highlighted participant 506.

The user may select which participant 504 should be the highlighted participant 506 using various input methods. For example, the user may use a pointing device or a touch screen to select the highlighted participant 506. Alternatively, the user may cycle through each of the participants 504 until the desired participant is highlighted. In some examples, the user may highlight multiple or all participants. After the highlighted participant 506 is selected, participant information corresponding to the highlighted participant may be retrieved and displayed.

Figure 6:
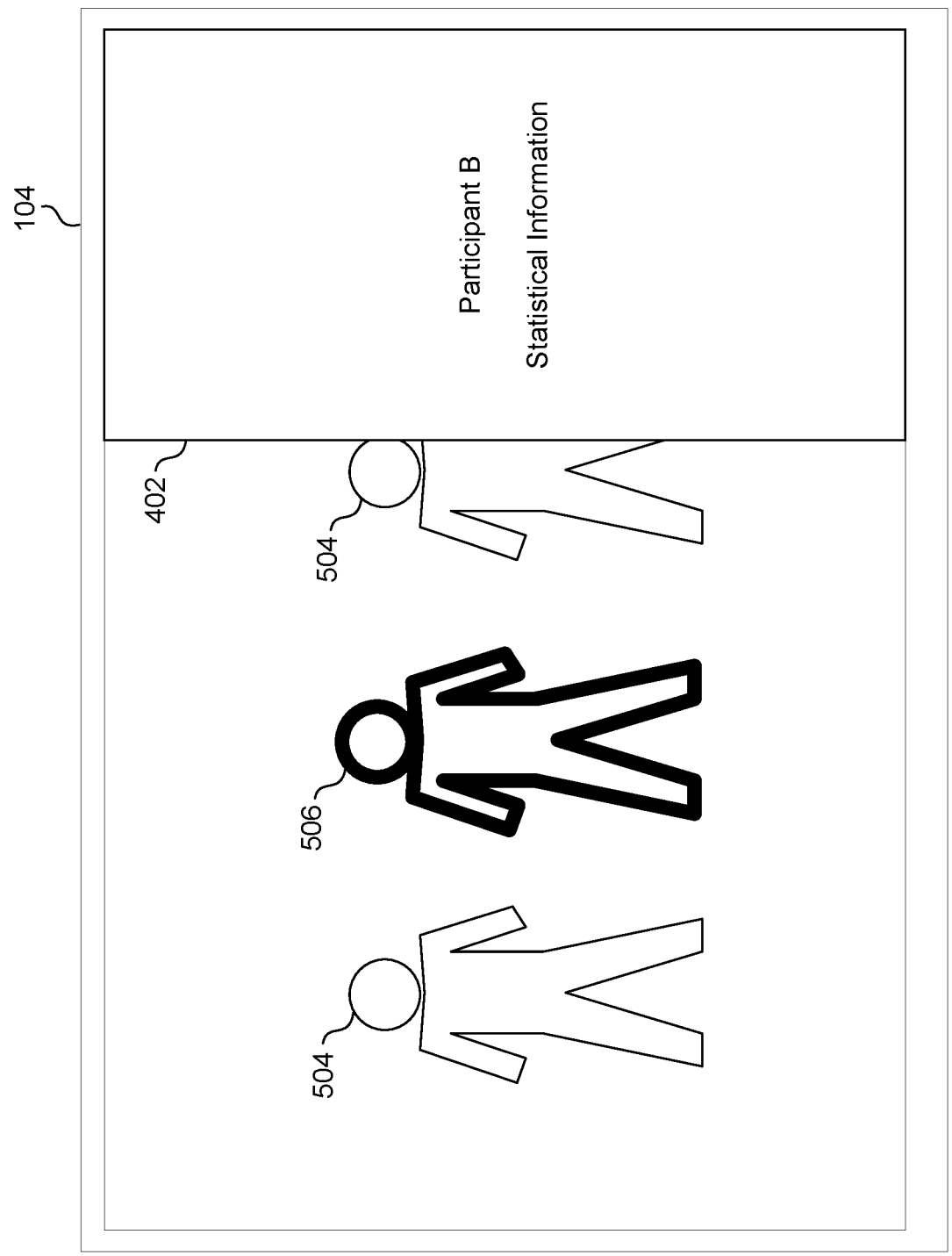
FIG. 6 illustrates an example of a presentation device displaying participant information for a highlighted participant.

FIG. 6 illustrates an example of a presentation device 104 displaying participant information 602 for a highlighted participant 506. As shown in FIG. 6, the participant information 602 may be rendered as a window overlaying the rendered media stream. The participant information 602 being displayed corresponds to the highlighted participant 506. The highlighted participant 506 may be selected as described in reference to FIG. 5. The participant information 602 may include the name of the participant, and statistics, facts, or other information related to the highlighted participant 506.

Figure 7:
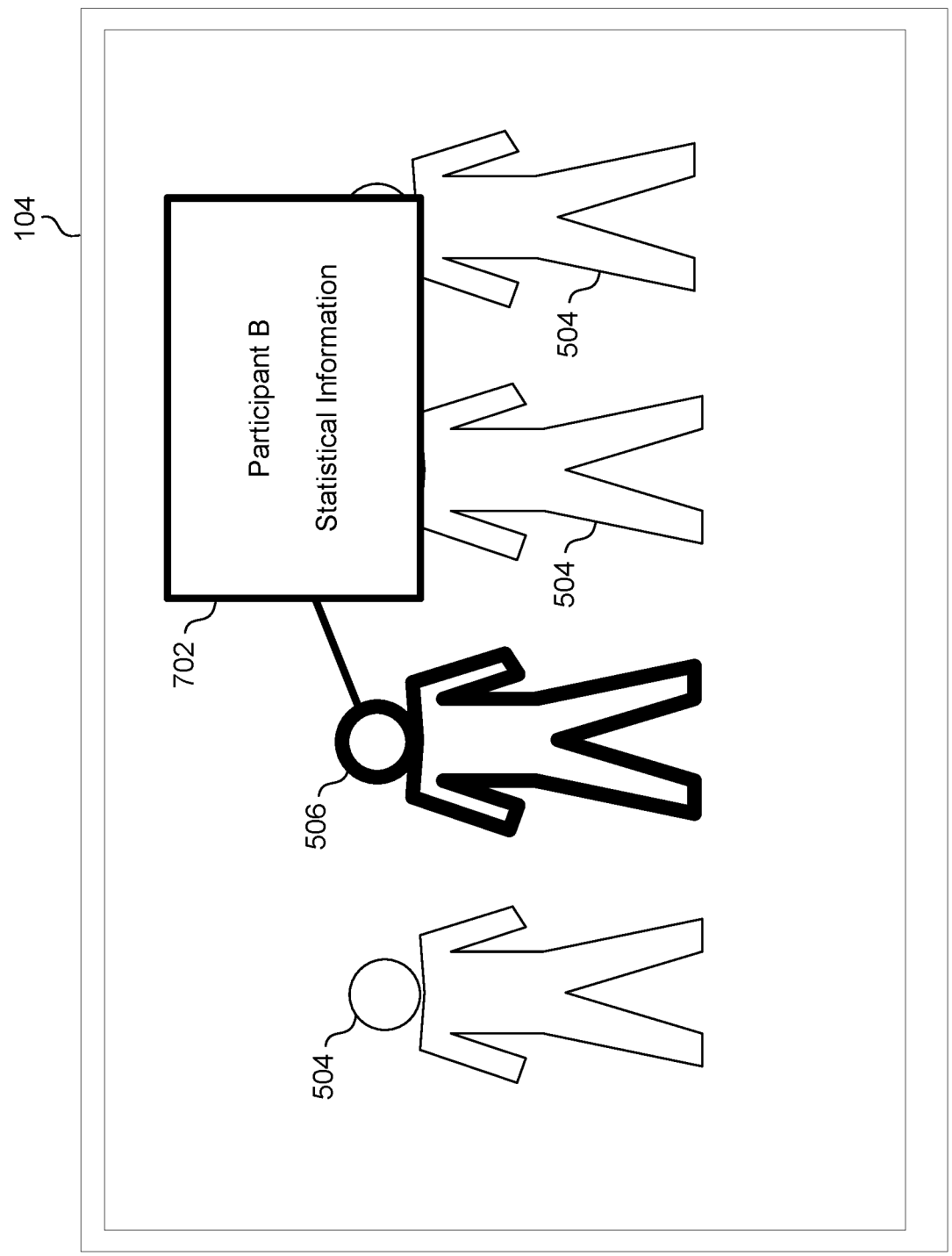
FIG. 7 illustrates another example of a presentation device displaying participant information for a highlighted participant.

FIG. 7 illustrates another example of a presentation device 104 displaying participant information 702 for a highlighted participant 506. As shown in FIG. 7, the participant information 702 may be rendered as a pop-up window linked to the highlighted participant 506 by a call-out line. The pop-up window may follow the highlighted participant 506 as the highlighted participant's position changes on the presentation device 104. The highlighted participant's position on the presentation device 104 may be tracked using location information included in the event data, as described in reference to FIG. 5. The participant information 702 being displayed corresponds to the highlighted participant 506 that was selected by the user. The participant information 702 may include the name of the participant, and statistics, facts, or other information related to the highlighted participant 506.

Figure 8:
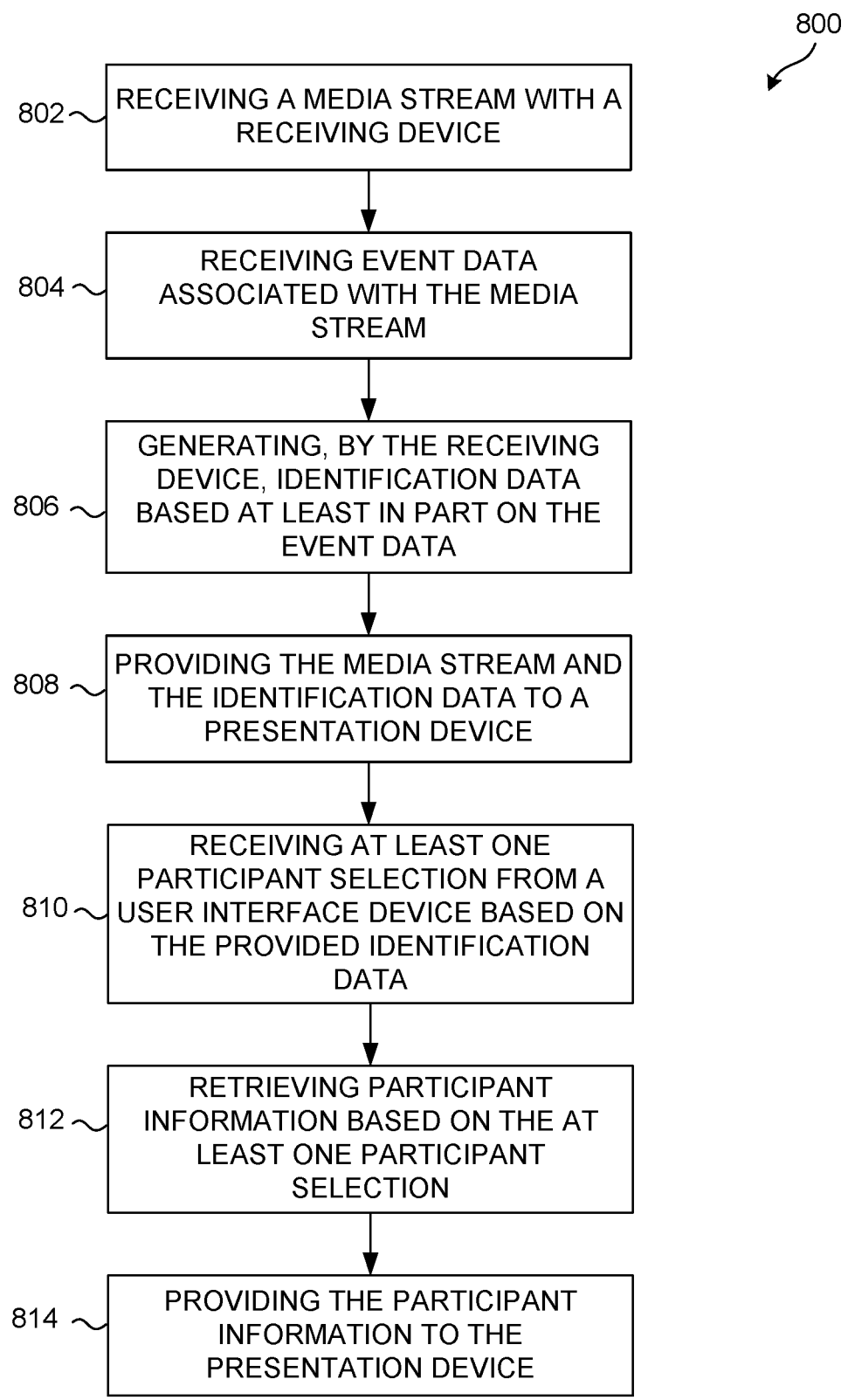
FIG. 8 is a flow diagram showing a method for presenting participant information on a presentation device.

FIG. 8 is a flow diagram showing an example of a method 800 for presenting participant information on a presentation device. The method 800 may be performed by a receiving device, such as the receiving devices described in reference to FIGS. 1 and 2.

At 802, a media stream is received by a receiving device. The media stream may include a sporting event media stream, a movie media stream, television show media stream, musical event media stream, an internet video media stream, or other categories of media content.

At 804, event data associated with the media stream is received. The event data may identify one or more participants currently participating in the media stream. In some embodiments, the event data may be embedded in the media stream.

At 806, identification data is generated by the receiving device based at least in part on the event data. In some embodiments, the identification data may include a list of participants currently being presented in the media stream. In other embodiments, the identification data may include an identifier of at least one participant currently being presented in the media stream. The identifier may include a pop-up window linked to the at least one participant. Alternatively, the identifier may include a highlighted outline linked to the at least one participant. The highlighted outline or pop-up window may track the participant's position using location information included in the event data.

At 808, the media stream and identification data are provided to a presentation device. The presentation device then displays the media stream and identification data to a user.

At 810, at least one participant selection is received from a user interface device based on the identification data being displayed on the presentation device. The user may select a participant by highlighting one or more participants being displayed.

At 812, participant information is retrieved based on the at least one participant selection. In some embodiments, the participant information may be embedded in the media stream. The participant information may include statistics associated with the at least one selected participant.

At 814, the participant information is provided to the presentation device. The presentation device may then present the participant information to the user. The participant information may be presented as a window overlaying a presentation of the media stream.

The method 800 may include additional acts, omit some acts, and/or may perform the acts in a different order than set out in the FIG. 8.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that many functions and/or operations within such block diagrams (e.g., the functions of the stream packer or stream packing apparatus), flowcharts, or examples can be implemented, individually and/or collectively, by a wide range of hardware, software, firmware, or virtually any combination thereof and that designing the circuitry and/or writing the code for the software and/or firmware would be well within the skill of one of ordinary skill in the art in light of the teachings of this disclosure. For example, the functions of the stream packer could be implemented in discrete logic with no central processing unit (CPU) or software involvement.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system (e.g., the control logic 412), apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. Aspects of the embodiments can be modified, if necessary, to employ systems, circuits and concepts of the various patents, applications and publications to provide yet further embodiments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
receiving a media stream with a receiving device, wherein the media stream includes a position indication of at least one participant;
retrieving participant information based on at least one participant selection; and
providing the participant information and the position indication of the at least one participant to a presentation device, wherein the participant information is visually presented in a movable designated area on the presentation device, wherein the movable designated area is linked to the at least one selected participant via a call-out line on the presentation device, wherein the position indication is determined based on information obtained by a positional sensor carried by the at least one participant, wherein the movable designated area is visually presented in a foreground of the presentation device, wherein the movable designated area includes a pop-up window, wherein the pop-up window and the call-out line are movable with respect to the at least one selected participant, wherein the pop-up window is maintained in a distant away from the participant, and wherein the distance is equal to a length of the call-out line.

2. The method of claim 1, wherein the media stream identifies one or more participants currently participating in the media stream.

3. The method of claim 1, wherein the media stream comprises a list of participants currently being presented in the media stream.

4. The method of claim 1, wherein the media stream comprises an identifier of at least one participant currently being presented in the media stream.

5. The method of claim 4, wherein the identifier comprises the pop-up window linked to the at least one participant, wherein the least one participant is a first participant, and wherein the pop-up window covers a second participant on the presentation device.

6. The method of claim 4, wherein the identifier comprises a highlighted outline linked to the at least one participant.

7. The method of claim 1, wherein the position indication is embedded in the media stream.

8. The method of claim 1, wherein the participant information is embedded in the media stream.

9. The method of claim 1, wherein the participant information comprises statistics associated with the at least one selected participant.

10. The method of claim 1 wherein the media stream is at least one of: a sporting event media stream, a movie media stream, a television show media stream, a musical event media stream, and an internet video media stream.

11. A receiving device, comprising:
a communication receiver configured to receive a media stream and a position indication of at least one participant associated with the media stream;
a user communication transceiver configured to receive at least one participant selection from a user interface device;
a control logic configured to retrieve participant information based on the at least one participant selection; and
a multimedia renderer configured to provide the participant information and the position indication of the at least one selected participant to a presentation device, wherein the participant information is visually presented in a movable designated area on the presentation device, wherein the movable designated area is linked to the at least one selected participant via a call-out line on the presentation device, wherein the position indication is determined based on information obtained by a positional sensor carried by the at least one participant, wherein the movable designated area is visually presented in a foreground of the presentation device, wherein the movable designated area includes a pop-up window, wherein the pop-up window and the call-out line are movable with respect to the at least one selected participant, wherein the pop-up window is maintained in a distance away from the participant, and wherein the distance is equal to a length of the call-out line.

12. The receiving device of claim 11, wherein the media stream identifies one or more participants currently participating in the media stream.

13. The receiving device of claim 11, wherein the media stream comprises a list of participants currently being presented in the media stream.

14. The receiving device of claim 11, wherein the media stream comprises an identifier of at least one participant currently being presented in the media stream.

15. The receiving device of claim 14, wherein the identifier comprises the pop-up window linked to the at least one participant, wherein the least one participant is a first participant, and wherein the pop-up window covers a second participant on the presentation device.

16. The receiving device of claim 14, wherein the identifier comprises a highlighted outline linked to the at least one participant.

17. The receiving device of claim 11, wherein the position indication is embedded in the media stream.

18. The receiving device of claim 11, wherein the participant information is embedded in the media stream.

19. The receiving device of claim 11, wherein the participant information comprises statistics associated with the at least one selected participant.

20. A system for presenting participant information in a media stream, comprising:
a memory configured to store computer readable instructions; and
a processor communicatively coupled to the memory, wherein the processor, when executing the computer readable instructions, is configured to:
receive a media stream with a receiving device, wherein the media stream includes a position indication of at least one participant;
receive at least one participant selection from a user interface device;
retrieve participant information based on the at least one participant selection; and
provide the participant information and the position indication of the at least one participant to a presentation device, wherein the participant information is visually presented in a movable designated area on the presentation device, wherein the movable designated area is linked to the at least one selected participant via a call-out line on the presentation device, wherein the position indication is determined based on information obtained by a positional sensor carried by the at least one participant, wherein the movable designated area is visually presented in a foreground of the presentation device, wherein the movable designated area includes a pop-up window, wherein the pop-up window and the call-out line are movable with respect to the at least one selected participant, wherein the pop-up window is maintained in a distance away from the participant, and wherein the distance is equal to a length of the call-out line.

* * * * *